United States Patent
Andersen et al.

(10) Patent No.: US 11,605,944 B2
(45) Date of Patent: Mar. 14, 2023

(54) DYNAMIC CONTROL OF TRIP TEMPERATURE FOR POWER MODULE

(71) Applicant: VESTAS WIND SYSTEMS A/S, Aarhus N (DK)

(72) Inventors: Thomas Lundgren Andersen, Hinnerup (DK); Kristian Bonderup Pedersen, Aalborg SØ (DK); Hardik Bodiwala, Egå (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 492 days.

(21) Appl. No.: 16/710,961

(22) Filed: Dec. 11, 2019

(65) Prior Publication Data
US 2020/0195002 A1 Jun. 18, 2020

(30) Foreign Application Priority Data
Dec. 13, 2018 (DK) .............................. PA201870813

(51) Int. Cl.
*H02H 7/12* (2006.01)
*G01K 3/00* (2006.01)
(Continued)

(52) U.S. Cl.
CPC ............... *H02H 7/12* (2013.01); *G01K 3/005* (2013.01); *G01K 7/22* (2013.01); *G01K 13/02* (2013.01);
(Continued)

(58) Field of Classification Search
CPC ........ H02H 7/12; H02H 1/0007; G01K 3/005; G01K 13/02; G01K 13/026
(Continued)

(56) References Cited

U.S. PATENT DOCUMENTS

| 2009/0167414 A1 | 7/2009 | Jansen |
| 2013/0027830 A1 | 1/2013 | Illing |

(Continued)

FOREIGN PATENT DOCUMENTS

| EP | 2811157 A1 | 12/2014 |
| EP | 2830218 A1 | 1/2015 |
| EP | 3457556 A1 | 3/2019 |

OTHER PUBLICATIONS

Danish Patent and Trademark Office 1st Technical Examination for PA 2018 70813 dated Apr. 29, 2019.
(Continued)

*Primary Examiner* — Yemane Mehari
(74) *Attorney, Agent, or Firm* — Patterson + Sheridan, LLP

(57) ABSTRACT

A wind turbine with a power converter system having a plurality of power modules each with a semiconductor component, such as IGBTs, and a temperature sensor arranged in thermal connection with the semiconductor component for generating a temperature signal according to a sensed temperature. A controller receives the temperature signals from the respective power modules, and the controller can shut down operation of the power converter system in case one or more of the temperature signals indicate a temperature exceeding a trip temperature threshold, wherein the controller is arranged to monitor at least one parameter and to update the trip temperature threshold accordingly.

17 Claims, 3 Drawing Sheets

(51) Int. Cl.
  *G01K 7/22* (2006.01)
  *G01K 13/02* (2021.01)
  *H02H 1/00* (2006.01)

(52) U.S. Cl.
  CPC ......... *H02H 1/0007* (2013.01); *G01K 13/026* (2021.01)

(58) Field of Classification Search
  USPC ........................................................ 361/103
  See application file for complete search history.

(56) References Cited

U.S. PATENT DOCUMENTS

| | | | |
|---|---|---|---|
| 2013/0134710 A1 | 5/2013 | Yuan et al. | |
| 2014/0212289 A1* | 7/2014 | Thogersen | G01K 15/00 374/152 |
| 2014/0361538 A1* | 12/2014 | Wagoner | H02P 9/102 290/44 |
| 2017/0122291 A1* | 5/2017 | Barker | F03D 7/048 |
| 2019/0052206 A1 | 2/2019 | Noderer | |

OTHER PUBLICATIONS

Danish Patent and Trademark Office Search Report for Application PA 2018 70813 dated Apr. 26, 2019.

Markus Andersen et al., "Temperature Control for More Reliable Power Electronics," IEEE Transactions on Electronics, vol. 33, No. 1, Jan. 2018.

Extended European Search Report for Application Number for Application No. 19215077.9-1007 dated May 18, 2020.

\* cited by examiner

DYNAMIC CONTROL OF TRIP TEMPERATURE FOR POWER MODULE

FIELD OF THE INVENTION

The present invention relates to the field of power converters, more specifically for protection of power modules in power converters, e.g. for power conversion of electric power generated in wind turbines.

BACKGROUND OF THE INVENTION

In a wind turbine a power converter serves to convert electric energy from a generator to an electric output with a suitable voltage and frequency e.g. for connection to an electric grid. The power converter includes power modules with switching components, e.g. based on Insulated Gate Bipolar Transistors (IGBTs). However, handling of a high power output with a limited number of power modules with a high failure causing shut down requires monitoring that the maximum temperature of the critical sub-components is not exceeded.

In a standard power module, liquid or air cooled, a temperature sensor, e.g. a thermistor (NTC), is a built-in component intended for monitoring device operation temperature. The critical IGBTs and power diodes are not allowed to pass 175° C. under any conditions, and this is in general sought achieved by monitoring the NTC temperature. However, since the temperature sensor is not in the same position as the critical component, i.e. the true junction temperature of the critical component can not be measured, they will not have the same temperature profile.

Normally, this is handled by setting a hard limit on the temperature sensor operation temperature, and the converter is then shut down, if this value is reached or exceeded. Commonly a temperature limit is set to such as 80-120° C. However, risks of placing a hard limit are: 1) setting a too high a value: then the converter will not be self-protecting during a failure (e.g. cooling stop), and this could potentially destroy the converter; 2) setting a too low value: a risk of shutting down the converter unnecessarily, meaning loss of production (a higher lost production factor); 3) the value does not correlate with all operation modes.

SUMMARY OF THE INVENTION

Thus, according to the above description, some embodiments disclosed herein provide a wind turbine with a high utilization of electric components, and still with a high reliability with respect to effective protection of the power converter system with an effective protection of the temperature critical semiconductor components to avoid critical component damage, yet the system should preferably be capable of utilizing the capacity of the semiconductor components, e.g. to reduce the number of power modules required for a given electric power handling. The system is preferably also suitable for use in a wind turbine.

In a first aspect, the invention provides a wind turbine comprising a power converter system comprising
- a plurality of power modules each comprising
  - at least one semiconductor component, e.g. an IGBT, and
  - a temperature sensor arranged in thermal connection with the semiconductor component, and being arranged to generate a temperature signal accordingly, and
- a controller arranged to receive temperature signals from the respective power modules, and to shut down operation of the power converter system in case the temperature signals indicate a temperature exceeding a trip temperature threshold, wherein the controller is arranged to monitor at least one parameter and to update the trip temperature threshold according to the at least one parameter.

Such a wind turbine is advantageous, since apart from monitoring the (built-in) temperature sensor of the power module of the power converter system, at least an additional parameter is monitored with the purpose of continuously adjusting the trip temperature threshold. In other words, the trip temperature threshold is dynamically updated in control of at least one, e.g. more, parameters such as measured parameters. This allows a good matching of the trip temperature threshold to the actual operating conditions of the wind turbine which in turn has influence of the converter, meaning a better utilization and protection of the power modules than in the case of using a fixed preset trip temperature threshold.

This is based on the insight of the inventors that the built-in temperature sensor does not only sense a temperature different from the critical semiconductor junction temperature, but the rate of change of the sensed temperature and the junction temperature is also significantly different. This means that for some operating conditions, e.g. power ramp up or down, the sensed temperature may be too high or too low compared with the true junction temperature. In the event that liquid cooling of the power module for some reason stops, it has been found the junction temperature will increase at a higher rate than the sensed temperature. With a fixed trip temperature threshold this can only be tackled by setting the trip temperature threshold low enough to ensure safe worst case operation, thus leading to a general poor utilization of the capacity of the power modules. With a trip threshold temperature which is set dynamically in response to e.g. coolant water inlet temperature (for water cooled power modules), it has been shown to be possible to closely match the trip temperature threshold to reflect the actual risk of the junction temperature reaching a critical level.

The trip temperature can also be dynamically set by more than one parameter, e.g. with an input to the controller indicating power mode of the converter, e.g. power mode of a wind turbine, it is possible to further calculate a trip temperature threshold for optimal matching to the actual operating conditions of the power modules. This leads to a high security for failure of a power module, and at the same time it is ensured that the capacity of the power modules is utilized under all operating conditions. As a result, the same power handling of the converter system can be implemented with fewer power modules without compromising operating safety and risk of loss of energy production in case of failure of the power modules, e.g. if used in a wind turbine.

In the following, preferred embodiments and features of the wind turbine will be described.

The controller may be arranged to update the trip temperature threshold by calculating an updated trip temperature threshold value according to a trip threshold algorithm in response to the at least one parameter.

The controller may be arranged to monitor at least two parameter, and to update the trip temperature threshold accordingly. Especially, a first parameter may be a temperature of a coolant liquid arranged for cooling the power modules, and a second parameter may be information regarding a power mode of operation of the power converter. These two parameters can be monitored, and a resulting trip temperature threshold can be updated in a repeated manner by continuous calculation of the trip temperature threshold according to a predetermined algorithm.

In a preferred embodiment, the plurality of power modules are cooled by a liquid, and wherein a temperature sensor is arranged to sense a temperature of the liquid and to generate a liquid temperature signal accordingly. The controller is then arranged to update the trip temperature threshold in response to the liquid temperature signal. Especially, it has been found that a significant improvement can be obtained by a simple relation between trip temperature and coolant liquid temperature, namely by setting the trip temperature threshold equal to the temperature of the coolant liquid plus an offset value. The offset value may be fixed value, or it may be an offset value which is updated in response to at least one parameter. Preferably, the controller is arranged to update the trip temperature threshold in response to the liquid temperature signal and at least one additional parameter, e.g. additional parameter(s) being one or both of: an ambient temperature, and a power mode of the converter system. Both of these parameter are known to have an influence of the operating conditions of a power converter in a wind turbine, and thus in more complex embodiments, these parameters can be taken account in the updating of the trip temperature threshold.

The temperature sensor arranged in thermal connection with the semiconductor component preferably comprises a thermistor e.g. a Negative Temperature Coefficient (NTC) thermistor positioned on a structure of the power module at a limited distance away from the at least one semiconductor component (IGBT), thus sensing a temperature which is related to the junction temperature of the semiconductor component, but where the thermal conduction between the semiconductor and the thermistor causes the sensed temperature to have a different temperature level, and in addition there is a latency between a change in junction temperature and change in the sensed temperature.

The at least one semiconductor component (IGBT) comprises at least one Gate Bipolar Transistor. Alternatively, or additionally, the power module may include one or more of: MOSFET, GTO, IGCT, and/or power electronic switches based on silicon carbide (SiC) technologies. Especially, the power converter system may be dimensioned to convert electric power of at least 1 MW, such as 2-10 MW or more. The power converter may comprise such as 2-100 power modules stacked to be able to handle the electric power capacity required by the power converter system. The power modules may each comprise a plurality of power electronic semiconductor switches controlled by an electric gatedriver, e.g. to cause the power modules to operate at a switching frequency of below 10 kHz, e.g. 1-10 kHz. The power modules may especially comprise an IGBT module, e.g. a primepack power module with a built-in termistor.

The controller may be arranged to determine to shut down by different strategies in response to the temperature sensors from the power modules. Either a shut down of the power converter is determined in case just one of the temperature sensors indicate a temperature exceeding the trip temperature threshold, or alternatively, a shut down is determined by calculating a combined temperature in response to the temperature signals from the plurality of power module, and comparing this combined temperature to the trip temperature threshold. E.g. it may be accepted that the temperature(s) exceed the trip temperature threshold over a short period of time before determining to shut down.

In an embodiment, the plurality of power modules are cooled by a liquid, and wherein a temperature sensor is arranged to sense a temperature of the liquid and to generate a liquid temperature signal accordingly, and wherein the controller is arranged to update the trip temperature threshold in response to the liquid temperature signal. Especially, the controller may be arranged to receive a signal indicative of a power mode of the wind turbine, and to update the trip temperature threshold in response to a combination of the liquid temperature signal and the signal indicative of the power mode of the wind turbine. By knowing the power mode set in by the wind turbine, the power converter controller can decide, and thus at least a part of the latency in the temperatures measured in the power module can be compensated for by updating the trip temperature threshold in advance of a foreseen development in the operation of the power modules.

In an embodiment, the wind turbine comprises a permanent magnet type electric generator for generating electric power to be converted by the power converter system.

In an embodiment, the controller of the power converter system is connected to a controller for controlling operation of the wind turbine, and wherein controller for controlling operation of the wind turbine is arranged to shut down operation of the wind turbine, in case the controller of the power converter system shuts down operation of the power converter system.

In a second aspect, the invention provides a method for controlling power conversion in a wind turbine, wherein the wind turbine comprises a power converter system with a plurality of power modules each comprising at least one semiconductor component, the method comprising sensing a temperature at a point with thermal connection to the at least one semiconductor component in each of the plurality of power modules, monitoring at least one parameter, updating a trip temperature threshold according to the at least one parameter, comparing the sensed temperatures with the trip temperature threshold, and shutting down operation of the power converter system if one or more of the sensed temperatures exceeds the trip temperature threshold.

In a preferred embodiment, the method comprises sensing a temperature of a liquid for cooling the power modules, and updating the trip temperature threshold according to this temperature, e.g. setting the trip temperature threshold equal to the liquid temperature plus an offset, e.g. a predetermined fixed offset.

It is to be understood that the same advantages and preferred embodiments and features mentioned for the first aspect apply as well for the second aspects, and the aspects may be mixed in any way.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
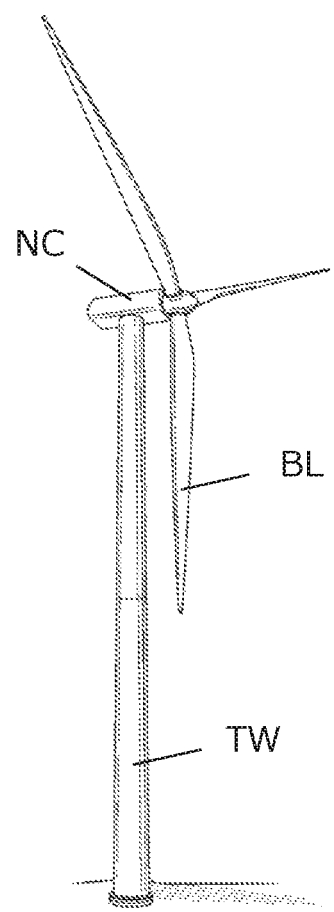
FIG. 1 illustrates a wind turbine, in which the power converter system of the invention is comprised.

FIG. 1 illustrates a wind turbine with three rotor blades BL for driving an electric generator located inside the nacelle NC on top of a tower TW. Typically, the power converter system in a wind turbine can be placed up-tower or down tower. The full scale converter typically comprises a power stack of power modules for AC/DC conversion and a power stack of power modules for DC/AC conversion. Furthermore, the converter system comprises reactors, filter capacitors, breakers, busbars and other converter related systems.

The wind turbine with the power converter system according to the invention is advantageous, e.g. for wind turbines capable of generating high electric power such as more than 1 MW. However, it is to be understood that the invention may be used as well in other power ranges, especially for applications ranging from such as 1 kW and upwards. A highly reliable performance of the converter system and thus also the wind turbine can be obtained due to the improved way of monitoring the power modules, and at the same time the power modules can be utilized more efficiently, thus potentially allowing a reduction in the number of power modules which can handle a given power capacity. This provides an efficient and yet reliable wind turbine.

Figure 2:
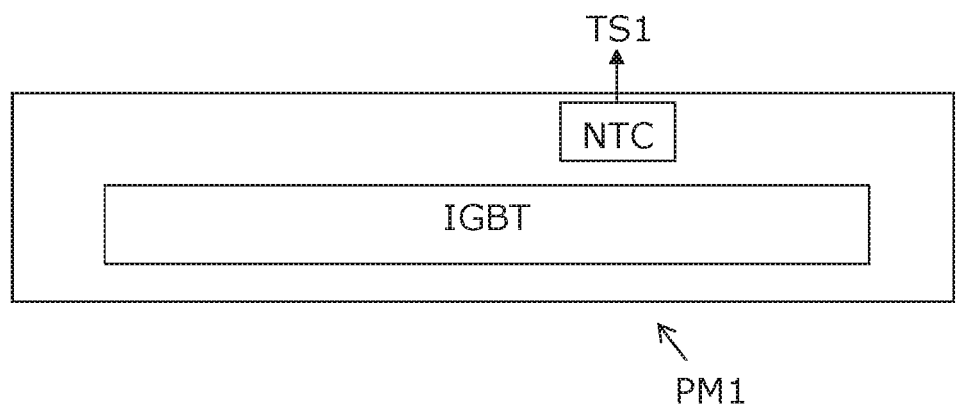
FIG. 2 illustrates a power module with a built-in temperature sensor.

FIG. 2 illustrates a sketch of a power module with a semiconductor power component IGBT serving to perform electrical switching and which can be used in a power converter system. A built-in temperature sensor NTC is positioned in thermal connection with the IGBT but at a distance from the semiconductor component IGBT, so that the sensed temperature TS1 is related to the temperature of the semiconductor component IGBT. However, the sensed temperature level and rate of change will be different from the junction temperature of the semiconductor component IGBT which is the critical temperature to monitor so as to ensure that a temperature of 175° C. is not exceeded. This can be handled by setting a hard limit, a trip temperature threshold used as a shut down limit to avoid failure of the power modules, e.g. involving explotion risks. Such hard limit for the sensed temperature is significantly lower than the junction temperature threshold 175° C., e.g. such as 80-120° C. is commonly used, to ensure shut down before damaging the power modules. The chosen trip temperature depends on many variables. For example: dc link voltage, phase current, switching frequency, cooling method, cooling medium temperature range, and many more.

However, using the same temperature sensor NTC in common power modules, the invention suggests to provide a dynamic setting of the trip temperature threshold, as will be described in the following.

Figure 3:
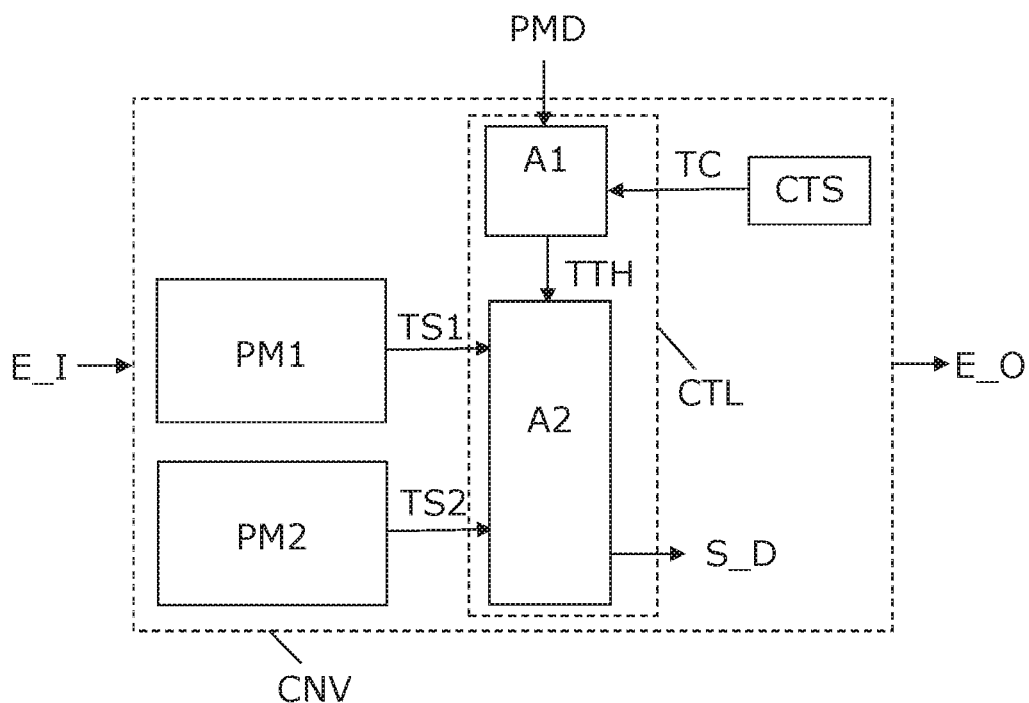
FIG. 3 illustrates a power converter system embodiment.

FIG. 3 shows a power converter system embodiment with a power converter CNV arranged to convert an electric power input E_I into an electric power output E_O. The power converter CNV comprises having a plurality of power modules PM1, PM2 each comprising each comprising a semiconductor component e.g. an IGBT based component, and a temperature sensor arranged in thermal connection with the semiconductor component, and being arranged to generate a respective temperature signal TS1, TS2 accordingly. These temperatures TS1, TS2 are applied to a controller CTL having a processor executing a control algorithm with two parts A1, A2. The first part of the control algorithm A1 calculates continuously a trip temperature threshold TTH in response to two parameters, namely:
1) temperature TC of coolant water for cooling the power modules PM1, PM2, and
2) a power mode PMD of the application where the power converter is used, e.g. a wind turbine. Especially, a coolant water temperature sensor CTS may be positioned to sense coolant water temperature TC at an inlet of coolant water. The first control algorithm part A1 calculates the trip temperature threshold in response to the coolant water temperature TC and the power mode PMD according to a predetermined algorithm. The second control algorithm part A2 receives the temperatures TS1, TS2 from the power modules PM1, PM2 and compares these with the dynamically updated trip temperature threshold TTH, and when a predetermined shut down criterion is met, e.g. one or an average of both temperatures TS1, TS2 exceed the threshold TTH, then the controller CTL determines to shut down S_D the converter to protect the power modules PM1, PM2 from damage. E.g. the shut down S_D signal can be sent to the general wind turbine controller or other application controller to inform about the converter shut down.

The dynamic updating of the trip temperature threshold including the coolant water temperature TC allows the controller CTL to adjust the trip temperature threshold TTH to a much more relevant value for comparison with the measured temperatures TS1, TS2 by the built-in temperatures sensors of the power modules PM1, PM2. Changes in coolant water temperature has been proven to significantly change the relevant trip temperature to avoid damage of the semiconductor components. Thus, with the dynamic trip temperature threshold TTH in dependence of the coolant water temperature TC allows this to be taken into account, e.g. by a simple offset value, e.g. a fixed offset value. In addition, with the dependency of the actual power mode setting has also been proven to influence the relevant trip temperature threshold TTH, thereby allowing the algorithm A1 to take advantage of the information of a change in power mode setting, which can significantly change junction temperature of the semiconductor component in advance of the effect measured by the built-in temperature sensors of the power modules PM1, PM2. Even further parameters, e.g. temperature of the environments and other parameters may be used to further refine the dynamic updating of the trip temperature threshold TTH, so as to better reflect the relevant value to compare with the measured temperatures TS1, TS2.

Only two power modules PM1, PM2 are shown for simplicity, it is to be understood that the power converter CNV can include stacks of a much larger number of power modules PM1, PM2 so as to allow the power converter CNV to convert electrical power of several MW.

Figure 4:
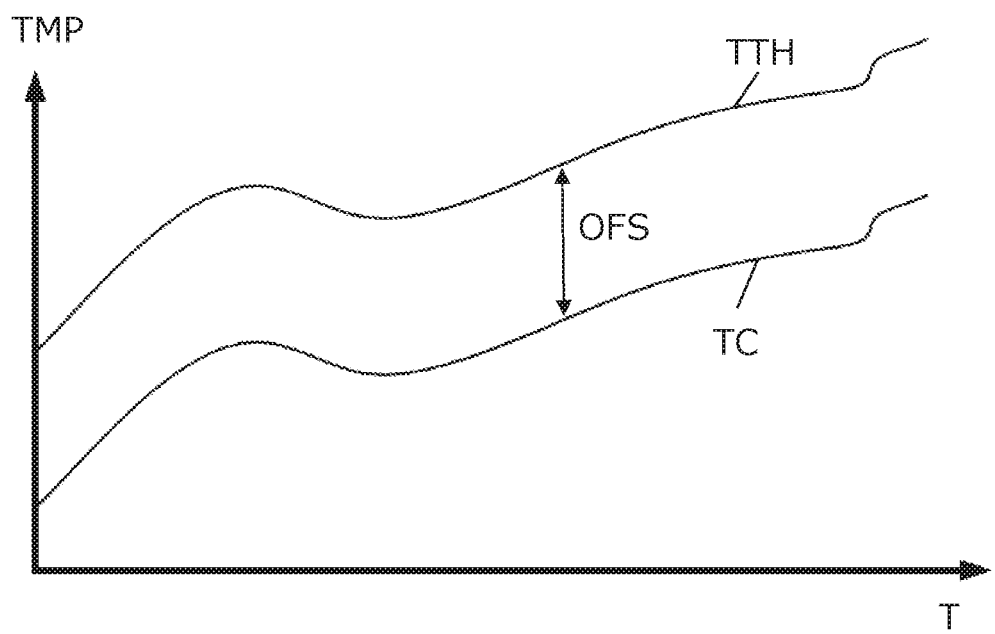
FIG. 4 illustrates steps of a method embodiment.

FIG. 4 illustrates a graph of temperature TMP versus time T for a rather simple embodiment, where the updated trip temperature threshold TTH is calculated as the coolant water temperature TC with the addition of a fixed value offset OFS. This has been shown to provide a reliable trip temperature threshold TTH which avoids:
1) a too high value, where the power converter will not be self-protecting during a failure, e.g. cooling stop, which could potentially damage the converter;
2) a too low value, which would cause a risk of shutting down the converter unnecessarily, meaning loss of production (a higher lost production factor); and 3) a value that does not correlate with all operation modes, meaning that the power module performance might not be balanced to the actual application.

With the dynamic trip temperature threshold TTH setting of the invention, a high security can be combined with a high utilization of the power modules.

It is to be understood that a fixed offset value OFS may be set according to the actual configuration of the power modules and other parameters, but in such offset OFS can be set in the range 5-80° C., such as 10-60° C.

In general, for a wind turbine power converter system, the trip temperature threshold TTH may be calculated as a sum of a baseline temperature T0 and an offset DT which both depend on more parameters:

$$TTH=T0(TC,PMD,TA)+DT(PMD,TA),$$

where TC is the coolant water temperature, PMD is the power mode of the wind turbine, and TA is the ambient temperature, i.e. the environmental temperature outside the wind turbine.

Figure 5:
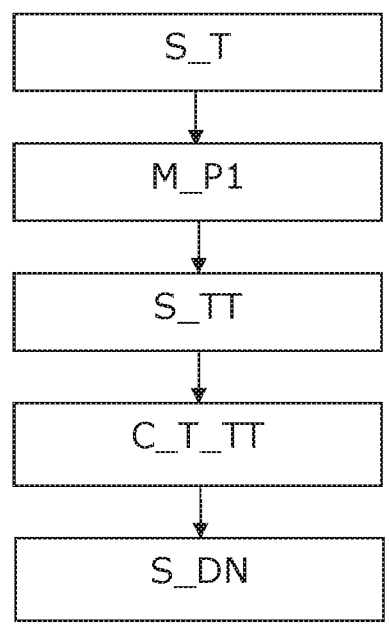
FIG. 5 illustrates a method for controlling a power converter system with a plurality of power modules.

FIG. 5 illustrates steps of an embodiment of a method for controlling a power converter system with a plurality of power modules handling electric switching operation of the power converter, each power module comprising at least one semiconductor component. The method involves sensing a temperature S_T at a point with thermal connection to the at least one semiconductor component in each of the plurality of power modules. Further, the method involves monitoring at least one parameter M_P1, e.g. a temperature of a coolant liquid for cooling the power modules, and updating a trip temperature threshold S_TT according to the at least one parameter, e.g. by setting the trip temperature threshold equal to the coolant liquid temperature plus a fixed offset. Next, comparing C_T_TT the sensed temperatures of the power modules with the trip temperature threshold, and shutting down S_DN operation of the power converter system if one or more of the sensed temperatures exceeds the trip temperature threshold.

To sum up: the invention provides a wind turbine with a power converter system having a plurality of power modules PM1, PM2 each with a semiconductor component, such as IGBTs, and a temperature sensor NTC arranged in thermal connection with the semiconductor component IGBT for generating a temperature signal T according to a sensed temperature. A controller CTL receives the temperature signals T from the respective power modules PM1, PM2, and the controller can shut down operation of the power converter system in case one or more of the temperature signals T indicate a temperature exceeding a trip temperature threshold TT, wherein the controller CTL is arranged to monitor at least one parameter P1 and to update the trip temperature threshold TT accordingly.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine comprising a power converter system, comprising:
a plurality of power modules each comprising:
at least one semiconductor component, and
a temperature sensor arranged in thermal connection with the semiconductor component, and being arranged to generate a temperature signal accordingly, and
a controller arranged to receive temperature signals from the respective power modules, and to shut down operation of the power converter system in case one or more of the temperature signals indicate a temperature exceeding a trip temperature threshold, wherein the controller is arranged to monitor at least one parameter and to update the trip temperature threshold according to the at least one parameter, wherein the at least one parameter comprises a liquid temperature signal corresponding to a temperature of a liquid used to cool the plurality of power modules.

2. The wind turbine according to claim 1, wherein the controller is arranged to update the trip temperature threshold by calculating an updated trip temperature threshold value according to a trip threshold algorithm in response to the at least one parameter.

3. The wind turbine according to claim 1, wherein the controller is arranged to monitor at least two parameters, and to update the trip temperature threshold accordingly.

4. The wind turbine according to claim 1, wherein a temperature sensor is arranged to sense the temperature of the liquid and to generate the liquid temperature signal.

5. The wind turbine according to claim 4, wherein the controller is arranged to update the trip temperature threshold by setting the trip temperature threshold equal to the temperature of the liquid plus an offset value.

6. The wind turbine according to claim 5, wherein the offset value is a fixed predetermined offset value.

7. The wind turbine according to claim 5, wherein the offset value is updated in response to at least one parameter.

8. The wind turbine according to claim 4, wherein the controller is arranged to update the trip temperature threshold in response to the liquid temperature signal and at least one additional parameter.

9. The wind turbine according to claim 8, wherein the at least one additional parameter comprises one or both of: an ambient temperature, and a power mode of the converter system.

10. The wind turbine according to claim 1, wherein the temperature sensor arranged in thermal connection with the semiconductor component comprises a thermistor positioned on a structure of the power module at a limited distance away from the at least one semiconductor component.

11. The wind turbine according to claim 1, wherein the at least one semiconductor component comprises at least one Gate Bipolar Transistor.

12. The wind turbine according to claim 1, wherein the at least one parameter comprises one or more of: a DC link voltage, a phase current, a switching frequency, a cooling method, and a cooling medium temperature range.

13. The wind turbine according to claim 1, wherein the controller is arranged to receive a signal indicative of a power mode of the wind turbine, and to update the trip temperature threshold in response to a combination of the liquid temperature signal and the signal indicative of the power mode of the wind turbine.

14. A method for controlling power conversion in a wind turbine, wherein the wind turbine comprises a power converter system with a plurality of power modules each comprising at least one semiconductor component; the method comprising:
sensing a temperature at a point with thermal connection to the at least one semiconductor component in each of the plurality of power modules;
monitoring at least one parameter;
updating a trip temperature threshold according to the at least one parameter, wherein the at least one parameter comprises a liquid temperature signal corresponding to a temperature of a liquid used to cool the plurality of power modules;
comparing the sensed temperatures with the updated trip temperature threshold; and
shutting down operation of the power converter system if one or more of the sensed temperatures exceeds the updated trip temperature threshold.

15. The method according to claim 14, wherein updating the trip temperature threshold comprises calculating an updated trip temperature threshold value according to a trip threshold algorithm in response to the at least one parameter.

16. The method according to claim 14, wherein the trip temperature threshold is updated based on at least two parameters.

17. A non-transitory computer readable medium containing a program which, when executed, performs an operation for controlling power conversion in a wind turbine, wherein the wind turbine comprises a power converter system with a plurality of power modules each comprising at least one semiconductor component; the operation, comprising:
sensing a temperature at a point with thermal connection to the at least one semiconductor component in each of the plurality of power modules;
monitoring at least one parameter;
updating a trip temperature threshold according to the at least one parameter, wherein the at least one parameter comprises a liquid temperature signal corresponding to a temperature of a liquid used to cool the plurality of power modules;
comparing the sensed temperatures with the updated trip temperature threshold; and
shutting down operation of the power converter system if one or more of the sensed temperatures exceeds the updated trip temperature threshold.

* * * * *